United States Patent [19]
Riser et al.

[11] Patent Number: 5,661,828
[45] Date of Patent: Aug. 26, 1997

[54] REFLECTOR FOR ILLUMINATION SYSTEM

[75] Inventors: Andrew P. Riser, Capistrano Beach, Calif.; Richard A. Albrecht, Durham, N.C.

[73] Assignee: Remote Source Lighting International, San Juan Capistrano, Calif.

[21] Appl. No.: 645,326

[22] Filed: May 13, 1996

Related U.S. Application Data

[63] Continuation-in-part of Ser. No. 374,163, Jan. 17, 1995, Pat. No. 5,559,911, and Ser. No. 601,373, Feb. 15, 1996.

[51] Int. Cl.[6] .............................. G02B 6/26; G02B 5/08; F21V 7/00
[52] U.S. Cl. .................. 385/31; 385/125; 385/133; 385/147; 385/901; 362/32; 362/341; 362/347; 359/838; 359/868
[58] Field of Search .................. 385/31, 33, 47, 385/125, 133, 34, 115, 116, 119; 359/838, 839, 868; 362/32, 341, 347

[56] References Cited

U.S. PATENT DOCUMENTS

| | | | |
|---|---|---|---|
| 4,050,784 | 9/1977 | Kobayashi | 385/34 X |
| 4,389,698 | 6/1983 | Cibie | 362/32 |
| 4,773,748 | 9/1988 | Shih et al. | 250/201 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,096,281 | 3/1992 | Windebank et al. | 359/868 |
| 5,222,793 | 6/1993 | Davenport et al. | 385/32 |
| 5,245,402 | 9/1993 | Adachi | 356/124 |
| 5,259,056 | 11/1993 | Davenport et al. | 385/115 |
| 5,367,590 | 11/1994 | Davenport et al. | 385/901 X |
| 5,396,571 | 3/1995 | Saadatmanesh et al. | 385/33 |
| 5,559,911 | 9/1996 | Forkner et al. | 385/33 |

FOREIGN PATENT DOCUMENTS

| | | | |
|---|---|---|---|
| 2651283 | 5/1978 | Germany | 362/32 X |
| 2098311 | 11/1982 | United Kingdom | 385/901 X |

*Primary Examiner*—Brian Healy
*Attorney, Agent, or Firm*—Donald E. Stout

[57] ABSTRACT

A hollow light guide illumination system is provided for coupling light from an illumination source to a hollow light guide, which is used for a variety of purposes, such as tunnels, hallways, and large rooms where direct lighting is dangerous, difficult to maintain, or subject to vandalism. The illumination system employs an illumination reflector which has been customized to maximize the efficiency of light transmission between the illumination source, such as an arc lamp, and the core of the hollow light guide. A method of fabricating the customized illumination reflector includes mapping the radiation patterns of the particular illumination source to be utilized, creating a database of those radiation patterns, and utilizing the database to generate an optimal illumination reflector configuration. The computer-generated reflector will virtually always be a non-conic section, because the illumination source is not ideal.

22 Claims, 2 Drawing Sheets

REFLECTOR FOR ILLUMINATION SYSTEM

This application is a continuation-in-part of U.S. application No. 08/374,163, entitled OPTICAL COUPLER, filed on Jan. 17, 1995, which issued into U.S. Pat. No. 5,559,911, the contents of which are expressly incorporated herein by reference. This application is also a continuation-in-part of U.S. application No. 08/601,373, entitled OPTICAL COUPLER and filed on Feb. 15, 1996, pending, and is related to U.S. application No. 08/645,327, pending, entitled REFLECTOR AND ILLUMINATION SYSTEM and filed on May 13, 1996, both of which are expressly incorporated herein by reference.

BACKGROUND OF THE INVENTION

Hollow light guides and similar components can be used in a variety of different environments including tunnels, hallways, and large rooms. Hollow light guides can be particularly advantageous in that only a single centralized illumination system need be maintained, rather than a plurality of individual lights.

One disadvantage associated with typical prior art hollow light guide systems, however, is their use of an illumination reflector to transmit light between the source of illumination and the output hollow light guide. These conventional illumination reflectors are based upon classic conic sections; i.e. elliptical or parabolic reflectors. Such reflectors are best for "ideal" light sources; i.e. "point" sources, but for "real world" light sources, light transmission efficiency is reduced.

SUMMARY OF THE INVENTION

This invention is an improvement over the prior art described above, because it employs an illumination reflector which has been customized to maximize the efficiency of light transmission between the illumination source, such as an arc lamp, and the core of the output hollow light guide. A method of fabricating the customized illumination reflector includes mapping the radiation patterns of the particular illumination source to be utilized, creating a database of those radiation patterns, and utilizing the database to generate an optimal illumination reflector configuration. The computer-generated reflector will virtually always be a non-conic section, because the illumination source is not ideal.

More particularly, a hollow light guide illumination system for coupling light from an illumination source to an output hollow light guide is disclosed. The output hollow light guide has a proximal end for receiving the light, and the illumination system includes an illumination reflector for receiving illumination from the illumination source and redirecting the illumination to the proximal end of the output hollow light guide. The illumination reflector is particularly designed to complement the illumination source with which it is paired, and therefore has a computer-generated non-circular cross-section and is both non-elliptical and non-parabolic.

In another aspect of the invention, a method of fabricating an illumination reflector for an illumination system is disclosed. Steps in the method include mapping the radiation patterns of the illumination source, and creating a database of these radiation patterns. Then, the database is used to generate an illumination reflector configuration which provides an optimal distribution and intensity of illumination at a proximal end of the output hollow light guide.

The present invention, together with additional features and advantages thereof, may best be understood by reference to the following description taken in connection with the accompanying illustrative drawings.

DETAILED DESCRIPTION OF THE PREFERRED EMBODIMENT

Figure 1:
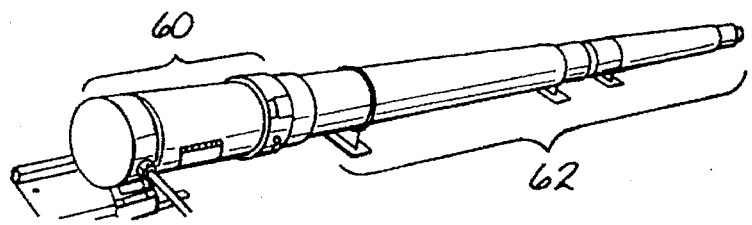
FIG. 1 is a perspective view of the illumination system of the present invention.

Referring now more specifically to the drawings, FIG. 1 illustrates a perspective view of an illumination system of the presently preferred embodiment. The illumination system comprises a light source portion 60 and a delivery portion 62. The illumination system may be used for a variety of purposes, such as tunnels, hallways, and large rooms where direct lighting is dangerous, difficult to maintain, or subject to vandalism.

Figure 2:
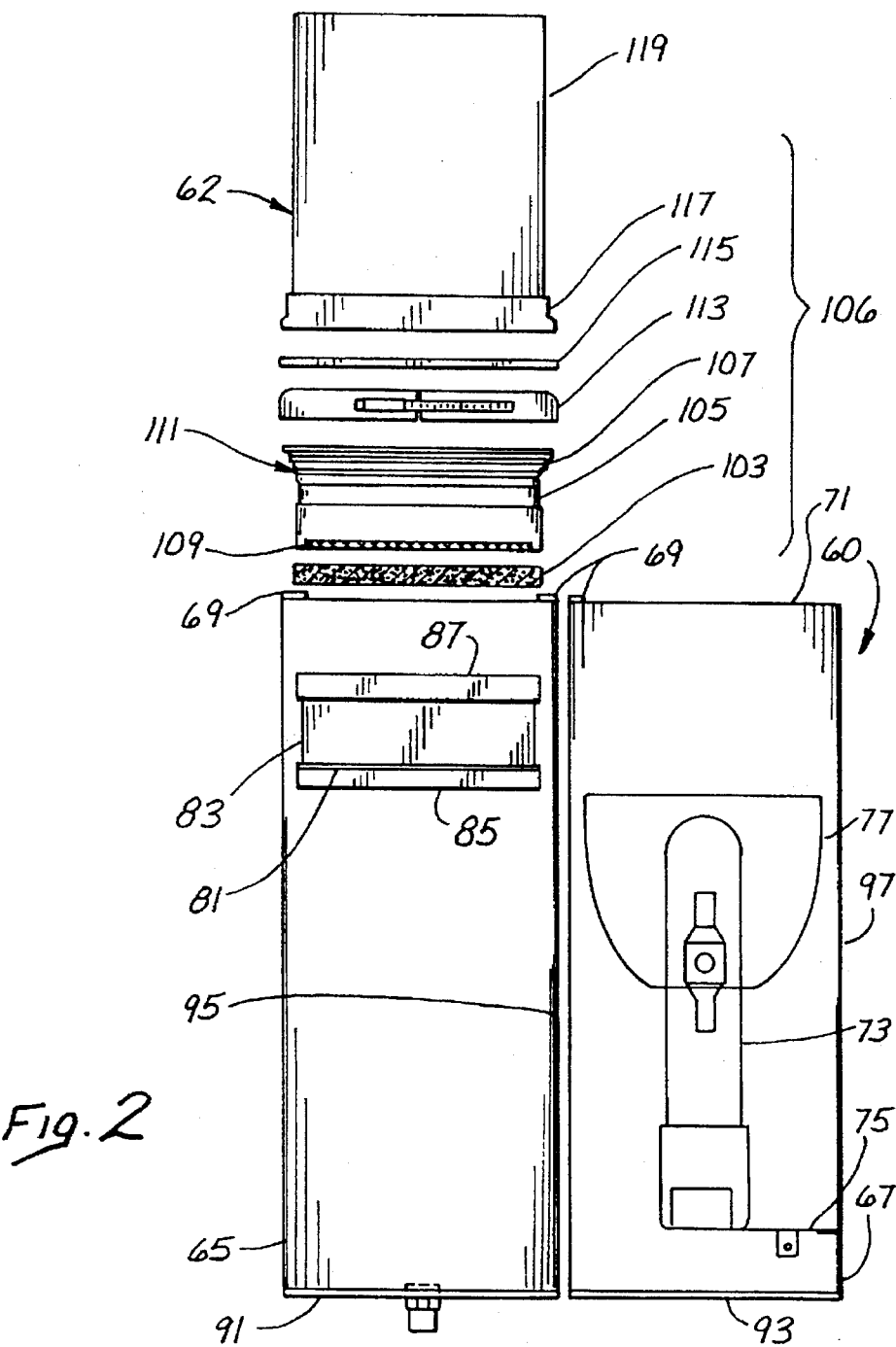
FIG. 2 is a cross-sectional view of the illumination source portion of the illumination system of the present invention.

FIG. 2 illustrates a partially exploded view of the light source portion 60 of the illumination system of the presently preferred embodiment coupled to the delivery portion 62. The light source portion 60 comprises a first cylindrical half 65 and a second cylindrical half 67 connected to the first cylindrical half 65 via hinges 69 and a front clamp 71. The first cylindrical half 65 and the second cylindrical half 67 comprise an illumination source housing for the hot bulb 73. The bulb 73 fits within a socket mount 75 and comprises an illuminating portion, which is surrounded by the illumination reflector 77 of the present invention. The illumination reflector 77 of the present invention directs light from the bulb 73 into heat resistant glass 81, which as presently preferred comprises ceramic glass. The ceramic glass 81 is surrounded by an aluminum collar 83 and may be heat resistant treated on the proximal side 85, the distal side 87, or both. Additionally, the ceramic glass may comprise one or more elements. In the presently preferred embodiment, the ceramic glass 81 comprises a single transparent element when the 250 watt bulb is used, and comprises two transparent elements when the 400 watt bulb is used.

When the first cylindrical half 65 and the second cylindrical half 67 are connected together via the hinges 69 and the front clamp 71, the end plates 91 and 93 come together, and the lid gasket surfaces 95 and 97 come together. In the presently preferred embodiment, the first cylindrical half 65 and the second cylindrical half 67 are formed of an aluminum extrusion.

The illumination source portion 60 is coupled to the delivery portion 62 via conventional coupling hardware 101, which preferably comprises a silicone end cap gasket 103 that fits around the gasket location 105. Additionally, the coupling hardware comprises a glass filled nylon end cap 107, a glass in end cap 109, and a front clamp groove 111. An aluminum band clamp 113 and a silicone gasket 115 fit around the acrylic flange 117 to thereby connect the acrylic pipe 119 to the two cylindrical halves 65 and 67. The illumination system shown in FIG. 2, with the exception of the illumination reflector 77 of the present invention, may be conventionally supplied by TIR Systems Ltd.

Figure 3:
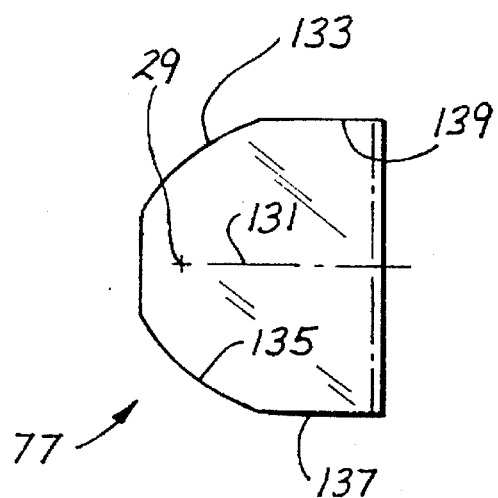
FIG. 3 is a schematic view of the computer-generated illumination reflector of the presently preferred embodiment.

FIG. 3 illustrates a cross-sectional view of the illumination reflector 77 of the presently preferred embodiment, which differs from conventional illumination reflectors by having a computer-generated curvature, which maximizes reflections of light from the bulb 73 into the ceramic glass 81. The illumination reflector 77 comprises a focal point 129, which is arbitrarily defined along the axis 131. The illumination reflector 77 comprises two curved surfaces 133 and 135, which preferably terminate at a two degree draft angle defining the straight surfaces 137 and 139, respectively. The straight surfaces 137 and 139 facilitate manufacturing and assembly convenience, but are not required. The illumination reflector 77 is preferably manufactured using a technique of nickel deposition or spinning. The illumination reflector 77 is then coated with aluminum and a dielectric film, such as $SiO_2$, for enhanced reflectivity.

An important aspect of the invention, which substantially improves the efficiency of the inventive system, is the use of non-classical, non-conic sections in the design of the illumination reflector 77. In the prior art, in contrast, classical conic sections are typically used in illumination reflector design, to create elliptical or parabolic reflectors. Byway of background, classical conic sections are so-named because they can be generated (and perhaps more importantly, visualized) by imagining the plane that would be exposed by slicing through a circular section cone. For example, if such a cone is sliced through with a cut that is exactly perpendicular to the long axis of the cone, the resulting exposed plane is a circle. This is the simplest example of a conic section. Like the other conic sections, the circle can be described algebraically, in this case by the expression:

$$(x^2+y^2)^{1/2}=r \quad (1)$$

wherein r is the radius of the circle, x is the x-coordinate value of the radius, and y is the y-coordinate value of the radius. In other words, the radius magnitude of the circle is always equal to the square root of the sum of the squares of its x-y coordinate values. The properties which this confers on the circle is that it has a single focal point equidistant from the focus of its circumference points, and that focus is in the center. This characteristic can be quite useful in optics.

If the slicing plane of the theoretical cone were to be tilted away from the perpendicular to the axis, other classical conic shapes are generated, not much more complex in mathematical description than the circle, but with ever more intriguing properties. From the standpoint of the history of optical design, two of the most important are the ellipse and the parabola.

The ellipse is a closed oval, and can be imagined by looking at the shape the edge of a circular coin makes as it is progressively tilted with respect to the observer's line of sight. The ellipse has the properties of having two focal points, or foci, both located along the line bisecting the ellipse's long axis (the circle is actually a special case of the ellipse, where the two foci are superimposed on one another, occupying the same point in space). The optical properties of an ellipse are such that any rays of light originating from exactly the point of focus on one side of the ellipse will be brought exactly to convergence at the complementary focus location, irrespective of their direction of origin.

Unlike the ellipse, the parabola is an open-figured shaped. It is generated by slicing the cone along a line parallel to its long axis, all the way down to its base. The resulting shape has a vertex at the small end and an open mouth opposite. The parabola has but a single focus. Its optical properties are such that a ray of light leaving the exact point of focus and bouncing off the surface of a parabolic reflector will exit the open mouth going exactly parallel to the long axis of the parabola, no matter where the ray strikes the reflector. Flashlight reflectors are often parabolic; by collimating the light (i.e. making all the rays travel parallel paths), the flashlight beam can be directed where it is needed and deliver the most light to the area of interest, instead of illuminating a large area dimly, as a non-directed bulb would do.

As a collector of light, the parabola has the ability to take collimated light directed toward it and concentrate that light at the focus point. This makes parabolic shapes useful for solar energy collectors.

The inventors have discovered, however, that the problem with using classical elliptical and parabolic reflectors, as contemplated in the prior art, is that, while the above analysis is done based upon ideal assumptions; i.e. that the light source occupies a "point" in space in the purest mathematical sense, in that it is dimensionless. If a light source used to illuminate an elliptical or parabolic reflector could occupy a dimensional space of zero, the easily-described, well-behaved "ideal" properties of these shapes would be realized. However such a light source is impossible in the physical world; a light source of zero dimension would, by definition, be infinitely bright. In the physical world, a light source is a very real, three dimensional object, whether it is the tungsten filament of an incandescent lamp, the arc of an arc lamp, or the glowing surface of a fluorescent lamp. Compared to the theoretically ideal "point source", all of these emitters of light are not only large, but generally of complex, and sometimes bizarre, shape.

What this means is that an "ideal" conic or parabolic reflector using a "real" light source not only does not conform to its theoretically predicted performance, but often diverges wildly from the expected behavior. In the prior art, this discrepancy between the theoretical and the realized behavior of conic-shape-based reflectors is just a tough fact of life. No good analytical tools have existed to help understand it, and no design tools existed to help overcome it.

The inventive new non-traditional approach utilizes non-conic sections. The designer is freed from the artifice of employing classical, easily-described shapes whose real-world performance may be fatally compromised, and given the freedom to use non-classical shapes, difficult to describe mathematically but amenable to analysis by the considerable number-crunching power of modern personal computers.

Thus, the inventive method for fabricating the reflector 77 shown in FIG. 3 begins with the mapping of the complex radiation patters of the real lamp 73 to be utilized in the particular apparatus. In a customized application, the lamp actually used in each individual device might actually be individually mapped. However, more typically, a particular manufacturer's lamp, designed by model number, is mapped, and the vagaries between individual lamps of a particular model or type of lamp, typically quite small, are ignored for the sake of manufacturing practicality and reasonable cost.

In the presently preferred embodiment, a Phillips 250 Watt bulb, Product Number 046677-33382-3, is used. Alternatively, a Phillips 400 Watt bulb, Product Number 046677-23127-4, may be used. Other bulbs may be used, as long as the model or product number of the specific bulb is noted for easy future reference.

Mapping in this sense, means to generate a collection of spatial intensity distribution measurements at a constant radial distance from the lamp, and storing the data in a computer storage location. This is done by moving a calibrated imaging detector array around the source in spherical coordinates until a detailed data file is obtained, point-by-point, of the lamp's specific radiation patterns. This detailed file does not really care about the relative "idealness" of the source; rather, the file contains a description of the radiation patterns emitted by the source, which are, by definition, what the reflector surface will actually "see".

Once the mapping process is complete, computer software is used to play the file containing the lamp's complex three-space emission pattern against the surface of any arbitrarily-defined reflector surface, whether a classic conic section or not, whether round (a surface of rotation) or not, whether comprised of smooth curves or an array of discrete facts. A focal point is defined on the surface, and the lamp is simulated to be placed at the focal point. The results of playing the lamp's real radiation patterns against the real reflector surface yields a highly accurate prediction of exactly what the resulting radiation product will look like at any point in space. The prediction can include the light intensity at any point, the rate of change of intensity between arbitrary points in the field, the angles of incidence of light through a given point, and other relevant measurements. This analytical power affords the ability to tailor the lamp/reflector combination to best satisfy the illumination requirements of the particular application, both in spatial intensity and angular distribution.

According to one specific implementation of the presently preferred embodiment, a 250 watt Phillips bulb is used in connection with the above-described method to generate an illumination reflector 77 having an optimized curvature. The dimensions of the curvature are expressed below in z and y coordinates, where the y coordinates are measured along an axis 131 (FIG. 3) that extends perpendicularly to the base of the illumination reflector 77 and through the bulb 73 (FIG. 2). The z coordinates are expressed in radial distances from the y axis. The specific coordinates for the illumination reflector 77 corresponding to the 250 watt Phillips bulb are reproduced below:

| | |
|---|---|
| −8.390996e−001 | 1.000000e+000 |
| −8.356348e−001 | 1.006527e+000 |
| −8.321400e−001 | 1.013064e+000 |
| −8.286149e−001 | 1.019610e+000 |
| −8.250594e−001 | 1.026166e+000 |
| −8.214731e−001 | 1.032732e+000 |
| −8.190652e−001 | 1.037115e+000 |
| −8.166435e−001 | 1.041503e+000 |
| −8.142079e−001 | 1.045895e+000 |
| −8.117585e−001 | 1.050291e+000 |
| −8.092951e−001 | 1.054693e+000 |
| −8.068178e−001 | 1.059098e+000 |
| −8.043263e−001 | 1.063508e+000 |
| −8.018207e−001 | 1.067923e+000 |
| −7.993009e−001 | 1.072342e+000 |
| −7.967668e−001 | 1.076766e+000 |
| −7.942184e−001 | 1.081195e+000 |
| −7.916556e−001 | 1.085628e+000 |
| −7.890783e−001 | 1.090066e+000 |
| −7.864866e−001 | 1.094509e+000 |
| −7.838802e−001 | 1.098957e+000 |
| −7.812591e−001 | 1.103409e+000 |
| −7.786233e−001 | 1.107866e+000 |
| −7.759727e−001 | 1.112328e+000 |
| −7.733071e−001 | 1.116794e+000 |
| −7.706267e−001 | 1.121265e+000 |
| −7.679313e−001 | 1.125742e+000 |

-continued

| | |
|---|---|
| −7.652208e−001 | 1.130223e+000 |
| −7.624952e−001 | 1.134709e+000 |
| −7.597544e−001 | 1.139199e+000 |
| −7.569981e−001 | 1.143695e+000 |
| −7.542267e−001 | 1.148196e+000 |
| −7.514398e−001 | 1.152702e+000 |
| −7.486373e−001 | 1.157212e+000 |
| −7.458192e−001 | 1.161728e+000 |
| −7.429856e−001 | 1.166249e+000 |
| −7.401363e−001 | 1.170774e+000 |
| −7.372711e−001 | 1.175305e+000 |
| −7.343900e−001 | 1.179841e+000 |
| −7.314931e−001 | 1.184382e+000 |
| −7.285801e−001 | 1.188928e+000 |
| −7.256508e−001 | 1.193480e+000 |
| −7.227055e−001 | 1.198036e+000 |
| −7.197439e−001 | 1.202598e+000 |
| −7.167659e−001 | 1.207165e+000 |
| −7.137716e−001 | 1.211737e+000 |
| −7.107607e−001 | 1.216314e+000 |
| −7.077332e−001 | 1.220897e+000 |
| −7.046892e−001 | 1.225484e+000 |
| −7.016283e−001 | 1.230077e+000 |
| −6.985505e−001 | 1.234676e+000 |
| −6.954560e−001 | 1.239280e+000 |
| −6.923444e−001 | 1.243889e+000 |
| −6.892157e−001 | 1.248503e+000 |
| −6.860698e−001 | 1.253123e+000 |
| −6.829068e−001 | 1.257749e+000 |
| −6.797263e−001 | 1.262379e+000 |
| −6.765285e−001 | 1.267016e+000 |
| −6.733131e−001 | 1.271657e+000 |
| −6.700802e−001 | 1.276305e+000 |
| −6.668296e−001 | 1.280957e+000 |
| −6.635612e−001 | 1.285616e+000 |
| −6.602750e−001 | 1.290279e+000 |
| −6.569706e−001 | 1.294949e+000 |
| −6.536483e−001 | 1.299624e+000 |
| −6.503080e−001 | 1.304304e+000 |
| −6.469492e−001 | 1.308990e+000 |
| −6.435723e−001 | 1.313682e+000 |
| −6.401770e−001 | 1.318380e+000 |
| −6.367630e−001 | 1.323083e+000 |
| −6.333305e−001 | 1.327792e+000 |
| −6.298794e−001 | 1.132507e+000 |
| −6.264094e−001 | 1.337227e+000 |
| −6.229205e−001 | 1.341953e+000 |
| −6.194127e−001 | 1.346685e+000 |
| −6.158857e−001 | 1.351423e+000 |
| −6.123395e−001 | 1.356167e+000 |
| −6.087741e−001 | 1.360916e+000 |
| −6.051891e−001 | 1.365671e+000 |
| −6.015848e−001 | 1.370432e+000 |
| −5.979608e−001 | 1.375199e+000 |
| −5.943171e−001 | 1.379972e+000 |
| −5.906538e−001 | 1.384751e+000 |
| −5.869705e−001 | 1.389536e+000 |
| −5.832672e−001 | 1.394327e+000 |
| −5.795437e−001 | 1.399124e+000 |
| −5.758001e−001 | 1.403927e+000 |
| −5.720361e−001 | 1.408736e+000 |
| −5.682516e−001 | 1.413551e+000 |
| −5.644467e−001 | 1.418372e+000 |
| −5.606211e−001 | 1.423199e+000 |
| −5.567746e−001 | 1.428032e+000 |
| −5.529073e−001 | 1.432871e+000 |
| −5.490192e−001 | 1.437717e+000 |
| −5.451097e−001 | 1.442569e+000 |
| −5.411791e−001 | 1.447426e+000 |
| −5.372272e−001 | 1.452290e+000 |
| −5.332538e−001 | 1.457161e+000 |
| −5.292588e−001 | 1.462037e+000 |
| −5.252423e−001 | 1.466920e+000 |
| −5.212038e−001 | 1.471809e+000 |
| −5.171435e−001 | 1.476704e+000 |
| −5.130612e−001 | 1.481605e+000 |
| −5.089566e−001 | 1.486513e+000 |
| −5.048298e−001 | 1.491428e+000 |
| −5.006806e−001 | 1.496348e+000 |
| −4.965090e−001 | 1.501275e+000 |

-continued

| | |
|---|---|
| −4.923145e−001 | 1.506209e+000 |
| −4.880975e−001 | 1.511148e+000 |
| −4.838575e−001 | 1.516094e+000 |
| −4.795942e−001 | 1.521047e+000 |
| −4.753080e−001 | 1.526006e+000 |
| −4.709986e−001 | 1.530971e+000 |
| −4.666656e−001 | 1.535943e+000 |
| −4.623092e−001 | 1.540922e+000 |
| −4.579290e−001 | 1.545907e+000 |
| −4.535249e−001 | 1.550898e+000 |
| −4.490971e−001 | 1.555896e+000 |
| −4.446452e−001 | 1.560901e+000 |
| −4.401689e−001 | 1.565912e+000 |
| −4.356684e−001 | 1.570930e+000 |
| −4.311435e−001 | 1.575954e+000 |
| −4.265937e−001 | 1.580985e+000 |
| −4.220194e−001 | 1.586023e+000 |
| −4.174202e−001 | 1.591067e+000 |
| −4.127958e−001 | 1.596118e+000 |
| −4.081462e−001 | 1.601176e+000 |
| −4.034715e−001 | 1.606240e+000 |
| −3.987710e−001 | 1.611311e+000 |
| −3.940452e−001 | 1.616389e+000 |
| −3.892936e−001 | 1.621474e+000 |
| −3.845160e−001 | 1.626565e+000 |
| −3.797123e−001 | 1.631664e+000 |
| −3.748825e−001 | 1.636768e+000 |
| −3.700263e−001 | 1.641880e+000 |
| −3.651434e−001 | 1.646999e+000 |
| −3.602341e−001 | 1.652124e+000 |
| −3.552980e−001 | 1.657256e+000 |
| −3.503346e−001 | 1.662395e+000 |
| −3.453443e−001 | 1.667541e+000 |
| −3.403267e−001 | 1.672694e+000 |
| −3.352816e−001 | 1.677854e+000 |
| −3.302089e−001 | 1.683020e+000 |
| −3.251085e−001 | 1.688194e+000 |
| −3.199801e−001 | 1.693374e+000 |
| −3.148237e−001 | 1.678562e+000 |
| −3.096389e−001 | 1.703756e+000 |
| −3.044257e−001 | 1.708957e+000 |
| −2.991840e−001 | 1.714166e+000 |
| −2.939135e−001 | 1.719381e+000 |
| −2.886139e−001 | 1.724603e+000 |
| −2.832853e−001 | 1.729832e+000 |
| −2.779276e−001 | 1.735068e+000 |
| −2.725404e−001 | 1.740311e+000 |
| −2.671233e−001 | 1.745562e+000 |
| −2.616767e−001 | 1.750819e+000 |
| −2.562001e−001 | 1.756083e+000 |
| −2.506931e−001 | 1.761355e+000 |
| −2.451560e−001 | 1.766633e+000 |
| −2.395884e−001 | 1.771919e+000 |
| −2.339899e−001 | 1.777211e+000 |
| −2.283607e−001 | 1.782511e+000 |
| −2.227005e−001 | 1.787818e+000 |
| −2.170088e−001 | 1.793132e+000 |
| −2.112859e−001 | 1.798453e+000 |
| −2.055313e−001 | 1.803781e+000 |
| −1.997447e−001 | 1.809116e+000 |
| −1.939263e−001 | 1.814459e+000 |
| −1.880757e−001 | 1.819808e+000 |
| −1.821925e−001 | 1.825165e+000 |
| −1.762768e−001 | 1.830529e+000 |
| −1.703284e−001 | 1.835900e+000 |
| −1.643468e−001 | 1.841278e+000 |
| −1.583322e−001 | 1.846663e+000 |
| −1.522843e−001 | 1.852055e+000 |
| −1.462027e−001 | 1.857455e+000 |
| −1.400871e−001 | 1.862862e+000 |
| −1.339377e−001 | 1.868276e+000 |
| −1.277540e−001 | 1.873697e+000 |
| −1.215358e−001 | 1.879125e+000 |
| −1.152831e−001 | 1.884560e+000 |
| −1.089955e−001 | 1.890003e+000 |
| −1.026727e−001 | 1.895453e+000 |
| −9.631479e−002 | 1.900910e+000 |
| −8.992138e−002 | 1.906374e+000 |
| −8.349203e−002 | 1.91845e+000 |
| −7.702696e−002 | 1.917323e+000 |

-continued

| | |
|---|---|
| −7.052573e−002 | 1.922809e+000 |
| −6.398788e−002 | 1.928302e+000 |
| −5.741365e−002 | 1.933802e+000 |
| −5.080257e−002 | 1.939309e+000 |
| −4.415419e−002 | 1.944923e+000 |
| −3.746874e−002 | 1.950344e+000 |
| −3.074575e−002 | 1.955873e+000 |
| −2.398477e−002 | 1.961408e+000 |
| −1.718601e−002 | 1.966951e+000 |
| −1.034901e−002 | 1.972501e+000 |
| −3.473294e−003 | 1.978058e+000 |
| 3.440909e−003 | 1.983622e+000 |
| 1.039408e−002 | 1.989193e+000 |
| 1.738645e−002 | 1.994771e+000 |
| 2.441853e−002 | 2.000357e+000 |
| 3.149007e−002 | 2.005949e+000 |
| 3.860156e−002 | 2.011549e+000 |
| 4.575350e−002 | 2.017155e+000 |
| 5.294566e−002 | 2.022769e+000 |
| 6.017853e−002 | 2.028390e+000 |
| 6.745263e−002 | 2.034017e+000 |
| 7.476771e−002 | 2.039652e+000 |
| 8.212429e−002 | 2.045293e+000 |
| 8.952285e−002 | 2.050942e+000 |
| 9.696321e−002 | 2.056597e+000 |
| 1.044459e−001 | 2.062260e+000 |
| 1.119713e−001 | 2.067930e+000 |
| 1.195394e−001 | 2.073606e+000 |
| 1.271505e−001 | 2.079289e+000 |
| 1.348053e−001 | 2.084979e+000 |
| 1.425034e−001 | 2.090676e+000 |
| 1.502455e−001 | 2.096380e+000 |
| 1.580321e−001 | 2.102090e+000 |
| 1.658629e−001 | 2.107808e+000 |
| 1.737385e−001 | 2.113532e+000 |
| 1.816592e−001 | 2.119262e+000 |
| 1.896255e−001 | 2.125000e+000 |
| 1.976371e−001 | 2.130744e+000 |
| 2.056947e−001 | 2.136494e+000 |
| 2.137989e−001 | 2.142252e+000 |
| 2.219493e−001 | 2.148016e+000 |
| 2.260422e−001 | 2.150901e+000 |
| 2.301465e−001 | 2.153787e+000 |
| 2.342629e−001 | 2.156675e+000 |
| 2.383912e−001 | 2.159564e+000 |
| 2.425310e−001 | 2.162455e+000 |
| 2.466830e−001 | 2.165348e+000 |
| 2.508470e−001 | 2.168242e+000 |
| 2.550226e−001 | 2.171138e+000 |
| 2.592105e−001 | 2.174036e+000 |
| 2.634105e−001 | 2.176935e+000 |
| 2.676223e−001 | 2.179835e+000 |
| 2.718465e−001 | 2.182738e+000 |
| 2.760829e−001 | 2.185642e+000 |
| 2.803312e−001 | 2.188547e+000 |
| 2.845920e−001 | 2.191454e+000 |
| 2.888652e−001 | 2.194363e+000 |
| 2.931504e−001 | 2.197273e+000 |
| 2.974482e−001 | 2.200185e+000 |
| 3.017585e−001 | 2.203099e+000 |
| 3.060809e−001 | 2.206013e+000 |
| 3.104161e−001 | 2.208930e+000 |
| 3.147638e−001 | 2.211848e+000 |
| 3.191238e−001 | 2.214768e+000 |
| 3.234967e−001 | 2.217689e+000 |
| 3.278823e−001 | 2.220612e+000 |
| 3.322802e−001 | 2.223536e+000 |
| 3.366912e−001 | 2.226462e+000 |
| 3.411150e−001 | 2.229389e+000 |
| 3.455513e−001 | 2.232318e+000 |
| 3.500007e−001 | 2.235248e+000 |
| 3.544631e−001 | 2.238180e+000 |
| 3.589380e−001 | 2.241113e+000 |
| 3.634263e−001 | 2.244048e+000 |
| 3.679273e−001 | 2.246984e+000 |
| 3.724417e−001 | 2.249922e+000 |
| 3.769692e−001 | 2.252861e+000 |
| 3.815096e−001 | 2.255802e+000 |
| 3.860634e−001 | 2.258744e+000 |
| 3.906305e−001 | 2.261688e+000 |

| | |
|---|---|
| 3.952106e−001 | 2.264633e+000 |
| 3.998043e−001 | 2.267580e+000 |
| 4.044114e−001 | 2.270528e+000 |
| 4.090316e−001 | 2.273477e+000 |
| 4.136655e−001 | 2.276428e+000 |
| 4.183130e−002 | 2.279380e+000 |
| 4.229737e−001 | 2.282334e+000 |
| 4.276484e−001 | 2.285289e+000 |
| 4.323366e−001 | 2.288246e+000 |
| 4.370382e−001 | 2.291204e+000 |
| 4.417539e−001 | 2.294163e+000 |
| 4.464833e−001 | 2.297124e+000 |
| 4.512262e−001 | 2.308986e+000 |
| 4.559834e−001 | 2.303049e+000 |
| 4.607544e−001 | 2.306014e+000 |
| 4.655391e−001 | 2.300080e+000 |
| 4.703381e−001 | 2.311948e+000 |
| 4.751511e−001 | 2.314917e+000 |
| 4.799778e−001 | 2.317887e+000 |
| 4.848191e−001 | 2.320858e+000 |
| 4.896745e−001 | 2.323831e+000 |
| 4.945438e−001 | 2.326805e+000 |
| 4.994278e−001 | 2.329780e+000 |
| 5.043260e−001 | 2.327157e+000 |
| 5.092384e−001 | 2.335735e+000 |
| 5.141654e−001 | 2.338714e+000 |
| 5.191070e−001 | 2.341695e+000 |
| 5.240627e−001 | 2.344676e+000 |
| 5.290332e−001 | 2.347659e+000 |
| 5.340185e−001 | 2.350644e+000 |
| 5.390180e−001 | 2.353629e+000 |
| 5.440325e−001 | 2.356616e+000 |
| 5.490618e−001 | 2.359603e+000 |
| 5.541056e−001 | 2.362592e+000 |
| 5.591645e−001 | 2.365582e+000 |
| 5.642384e−001 | 2.368574e+000 |
| 5.693269e−001 | 2.371567e+000 |
| 5.744308e−001 | 2.374560e+000 |
| 5.795496e−001 | 2.377555e+000 |
| 5.846831e−001 | 2.380551e+000 |
| 5.898322e−001 | 2.383548e+000 |
| 5.949962e−001 | 2.386546e+000 |
| 6.001757e−001 | 2.389545e+000 |
| 6.053705e−001 | 2.392546e+000 |
| 6.105803e−001 | 2.395547e+000 |
| 6.158059e−001 | 2.398550e+000 |
| 6.210469e−001 | 2.401554e+000 |
| 6.263031e−001 | 2.404558e+000 |
| 6.315751e−001 | 2.407564e+000 |
| 6.368628e−001 | 2.410571e+000 |
| 6.421657e−001 | 2.413579e+000 |
| 6.474848e−001 | 2.416588e+000 |
| 6.528195e−001 | 2.419598e+000 |
| 6.581699e−001 | 2.422609e+000 |
| 6.635363e−001 | 2.425621e+000 |
| 6.689187e−001 | 2.428634e+000 |
| 6.743166e−001 | 2.431647e+000 |
| 6.797310e−001 | 2.434662e+000 |
| 6.851614e−001 | 2.437678e+000 |
| 6.906076e−001 | 2.440695e+000 |
| 6.960704e−001 | 2.443712e+000 |
| 7.015494e−001 | 2.446731e+000 |
| 7.070442e−001 | 2.449750e+000 |
| 7.125558e−001 | 2.452770e+000 |
| 7.180838e−001 | 2.455791e+000 |
| 7.236279e−001 | 2.458813e+000 |
| 7.291889e−001 | 2.461836e+000 |
| 7.347663e−001 | 2.464860e+000 |
| 7.403600e−001 | 2.467884e+000 |
| 7.459708e−001 | 2.470910e+000 |
| 7.515983e−001 | 2.473936e+000 |
| 7.572422e−001 | 2.476963e+000 |
| 7.629033e−001 | 2.479990e+000 |
| 7.685812e−001 | 2.483018e+000 |
| 7.742757e−001 | 2.486047e+000 |
| 7.799876e−001 | 2.489077e+000 |
| 7.857166e−001 | 2.492107e+000 |
| 7.914622e−001 | 2.495138e+000 |
| 7.972255e−001 | 2.498170e+000 |
| 8.030060e−001 | 2.501203e+000 |
| 8.088034e−001 | 2.504236e+000 |
| 8.146185e−001 | 2.507270e+000 |
| 8.204510e−001 | 2.510304e+000 |
| 8.263004e−001 | 2.513339e+000 |
| 8.321680e−001 | 2.516375e+000 |
| 8.380530e−001 | 2.519411e+000 |
| 8.439552e−001 | 2.522447e+000 |
| 8.498755e−001 | 2.525484e+000 |
| 8.558131e−001 | 2.528522e+000 |
| 8.617690e−001 | 2.531560e+000 |
| 8.677427e−001 | 2.534599e+000 |
| 8.737339e−001 | 2.537637e+000 |
| 8.797435e−001 | 2.540677e+000 |
| 8.857711e−001 | 2.543717e+000 |
| 8.918164e−001 | 2.546757e+000 |
| 8.978803e−001 | 2.549798e+000 |
| 9.039624e−001 | 2.552840e+000 |
| 9.100624e−001 | 2.555881e+000 |
| 9.161811e−001 | 2.558923e+000 |
| 9.223182e−001 | 2.561965e+000 |
| 9.284734e−001 | 2.565008e+000 |
| 9.346475e−001 | 2.568051e+000 |
| 9.408402e−001 | 2.571094e+000 |
| 9.470512e−001 | 2.574138e+000 |
| 9.532812e−001 | 2.577181e+000 |
| 9.595300e−001 | 2.580225e+000 |
| 9.657971e−001 | 2.583269e+000 |
| 9.720836e−001 | 2.586313e+000 |
| 9.783891e−001 | 2.589358e+000 |
| 9.847132e−001 | 2.592403e+000 |
| 9.910567e−001 | 2.595447e+000 |
| 9.974194e−001 | 2.598492e+000 |
| 1.003801e+000 | 2.601537e+000 |
| 1.010202e+000 | 2.604582e+000 |
| 1.016622e+000 | 2.607627e+000 |
| 1.023062e+000 | 2.610672e+000 |
| 1.029521e+000 | 2.613717e+000 |
| 1.036000e+000 | 2.616762e+000 |
| 1.042498e+000 | 2.619807e+000 |
| 1.049016e+000 | 2.622851e+000 |
| 1.055553e+000 | 2.625896e+000 |
| 1.062110e+000 | 2.628941e+000 |
| 1.068688e+000 | 2.631985e+000 |
| 1.075285e+000 | 2.635030e+000 |
| 1.081902e+000 | 2.638074e+000 |
| 1.088539e+000 | 2.641118e+000 |
| 1.095196e+000 | 2.644162e+000 |
| 1.101873e+000 | 2.647205e+000 |
| 1.108571e+000 | 2.650249e+000 |
| 1.115289e+000 | 2.653292e+000 |
| 1.122027e+000 | 2.656334e+000 |
| 1.128786e+000 | 2.659377e+000 |
| 1.135565e+000 | 2.662419e+000 |
| 1.142365e+000 | 2.665461e+000 |
| 1.149185e+000 | 2.668502e+000 |
| 1.156026e+000 | 2.671543e+000 |
| 1.162888e+000 | 2.674583e+000 |
| 1.169771e+000 | 2.677623e+000 |
| 1.176674e+000 | 2.680662e+000 |
| 1.183599e+000 | 2.683701e+000 |
| 1.190544e+000 | 2.686739e+000 |
| 1.197511e+000 | 2.689777e+000 |
| 1.204499e+000 | 2.692814e+000 |
| 1.211508e+000 | 2.695851e+000 |
| 1.218538e+000 | 2.698886e+000 |
| 1.225590e+000 | 2.701921e+000 |
| 1.232663e+000 | 2.704956e+000 |
| 1.239758e+000 | 2.707990e+000 |
| 1.246874e+000 | 2.711023e+000 |
| 1.254012e+000 | 2.714055e+000 |
| 1.261173e+000 | 2.717086e+000 |
| 1.268354e+000 | 2.720117e+000 |
| 1.275557e+000 | 2.723146e+000 |
| 1.282783e+000 | 2.726175e+000 |
| 1.290030e+000 | 2.729203e+000 |
| 1.297299e+000 | 2.732229e+000 |
| 1.304591e+000 | 2.735255e+000 |
| 1.311905e+000 | 2.738279e+000 |
| 1.319241e+000 | 2.741303e+000 |
| 1.326600e+000 | 2.744325e+000 |

-continued

| | |
|---|---|
| 1.333980e+000 | 2.747347e+000 |
| 1.341384e+000 | 2.750367e+000 |
| 1.348810e+000 | 2.753386e+000 |
| 1.356259e+000 | 2.756404e+000 |
| 1.363730e+000 | 2.759421e+000 |
| 1.371225e+000 | 2.762436e+000 |
| 1.378741e+000 | 2.765450e+000 |
| 1.386281e+000 | 2.768463e+000 |
| 1.393845e+000 | 2.771474e+000 |
| 1.401431e+000 | 2.774484e+000 |
| 1.409040e+000 | 2.777492e+000 |
| 1.416673e+000 | 2.780500e+000 |
| 1.424329e+000 | 2.783505e+000 |
| 1.432008e+000 | 2.786509e+000 |
| 1.439711e+000 | 2.789511e+000 |
| 1.447437e+000 | 2.792512e+000 |
| 1.455187e+000 | 2.795511e+000 |
| 1.462961e+000 | 2.798509e+000 |
| 1.470758e+000 | 2.801504e+000 |
| 1.478579e+000 | 2.804498e+000 |
| 1.486425e+000 | 2.807491e+000 |
| 1.494294e+000 | 2.010481e+000 |
| 1.502187e+000 | 2.813469e+000 |
| 1.510105e+000 | 2.816456e+000 |
| 1.518046e+000 | 2.819441e+000 |
| 1.526012e+000 | 2.822423e+000 |
| 1.534003e+000 | 2.825405e+000 |
| 1.542018e+000 | 2.828383e+000 |
| 1.550057e+000 | 2.831360e+000 |
| 1.558121e+000 | 2.834335e+000 |
| 1.566210e+000 | 2.837307e+000 |
| 1.574323e+000 | 2.840277e+000 |
| 1.582462e+000 | 2.843245e+000 |
| 1.590624e+000 | 2.846210e+000 |
| 1.598812e+000 | 2.849173e+000 |
| 1.607026e+000 | 2.852134e+000 |
| 1.615264e+000 | 2.855093e+000 |
| 1.623527e+000 | 2.858048e+000 |
| 1.631817e+000 | 2.861002e+000 |
| 1.640131e+000 | 2.863953e+000 |
| 1.648470e+000 | 2.866901e+000 |
| 1.656835e+000 | 2.869847e+000 |
| 1.665227e+000 | 2.872790e+000 |
| 1.673643e+000 | 2.875730e+000 |
| 1.682085e+000 | 2.878668e+000 |
| 1.690554e+000 | 2.881603e+000 |
| 1.699048e+000 | 2.884535e+000 |
| 1.707568e+000 | 2.887464e+000 |
| 1.716115e+000 | 2.890391e+000 |
| 1.724687e+000 | 2.893314e+000 |
| 1.733286e+000 | 2.896234e+000 |
| 1.741912e+000 | 2.899152e+000 |
| 1.750563e+000 | 2.902066e+000 |
| 1.759240e+000 | 2.904976e+000 |
| 1.767946e+000 | 2.907884e+000 |
| 1.776677e+000 | 2.910789e+000 |
| 1.785435e+000 | 2.913690e+000 |
| 1.794220e+000 | 2.916588e+000 |
| 1.803032e+000 | 2.919482e+000 |
| 1.811870e+000 | 2.922373e+000 |
| 1.820737e+000 | 2.925260e+000 |
| 1.829629e+000 | 2.928144e+000 |
| 1.838549e+000 | 2.931024e+000 |
| 1.847498e+000 | 2.933901e+000 |
| 1.856472e+000 | 2.936774e+000 |
| 1.865474e+000 | 2.939643e+000 |
| 1.874505e+000 | 2.942509e+000 |
| 1.883562e+000 | 2.945370e+000 |
| 1.892648e+000 | 2.948228e+000 |
| 1.901761e+000 | 2.951081e+000 |
| 1.910902e+000 | 2.953931e+000 |
| 1.920071e+000 | 2.956776e+000 |
| 1.929269e+000 | 2.959618e+000 |

In the presently preferred embodiment, the input hole of the illumination reflector 77, which accommodates the bulb 73, is reduced to 1.9 inches, which requires an extrapolation of the computer-generated curve expressed above to a y value of 0.95 inches. Thus, as presently embodied, the y values are all multiplied by 0.95 inches to generate the presently preferred embodiment, which comprises an input hole of 1.9 inches instead of approximately 2 inches. Looking at the z and y coordinates reproduced above, the first number in each pair of coordinates is the z axis coordinate with zero at the focal point. The second number is the y axis coordinate. The first number in the above list, for example, comprises a y value of 1 resulting in a 2 inch diameter hole at the base of the illumination reflector 77. The final y value in the above list is nearly 3 inches resulting in a diameter of the illumination reflector 77 of nearly 6 inches. The focal point 129 of the illumination reflector 77 corresponds to the point −3.473294e−003, 1.978058e+000 in the above list of coordinates. The computer-generated curvature of the illumination reflector 77 of the presently preferred embodiment is capable of generating improvements in luminous flux over conventional illumination reflectors.

Figure 4:
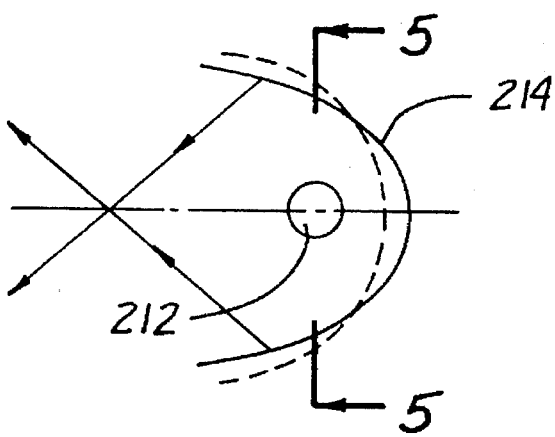
FIG. 4 is a schematic top view of the present invention, illustrating an illumination source and an illumination reflector having a computer-generated curvature.
Figure 5:
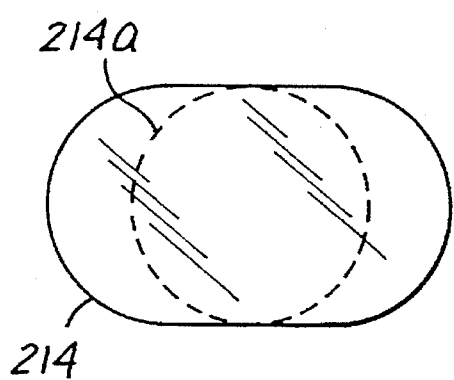
FIG. 5 is a cross-sectional view taken along lines 5—5 of FIG. 4, particularly illustrating the illumination reflector fabricated in accordance with the principles of the present invention.

FIGS. 4 and 5 illustrate a source of illumination 212, comprising any conventional light source, such as an arc lamp or the like, and an illumination reflector 214, which reflects the light from the lamp to an optical component (not shown). Reference numeral 214 denotes an exemplary non-conic illumination reflector which might be generated using the method described above. Reference numeral 214a denotes, in contrast, a classic conic illumination reflector, having a circular cross section (FIG. 5) which might be used in the prior art. The deviation of the shape of reflector 214 from a surface of revolution of a classic conic section has been exaggerated for illustrative purposes.

Another advantage of the non-conic illumination reflector 77 designed and fabricated in accordance with the principles of this invention is the ability to utilize higher intensity light at the hollow light guide end face without burning the hollow light guide end. Optical beams do not naturally have a uniform intensity distribution across the beam. Imperfections in optical systems can produce peaks and other non-uniformities. Even in ideal systems the intensity distribution will tend toward a Gaussian distribution. A Gaussian beam has a peaked distribution described by $$I = e^{-x} \qquad (2)$$

where I is the intensity of the beam and x is the distance from the center of the beam. Lasers are naturally Gaussian. Other light beams will approach Gaussian as they are diffracted in an optical system.

The existence of intensity peaks when light is launched into a hollow light guide can result in burning. This in turn limits the maximum power that can be safely launched into a hollow light guide. For example, when a beam of light is directed onto the end of a bundle of hollow light guides the center hollow light guide(s) tend to burn because intensity of the light is peaked near the center.

The non-conic illumination reflector shapes generated by the inventive methods not only compensate for the shape of the lamp but also produce a more uniform intensity distribution at the hollow light guide end face. This permits the safe use of higher intensity levels without burning the hollow light guide ends.

It should be noted that this technique for mapping the radiation patterns of a light source, and developing a database from which a reflector may be designed for an illumination system, is not limited to optic applications. It is also useful for other types of illumination applications, such as projection systems, for example. Furthermore, the database which is developed from the mapping process may be used to fabricate customized lenses as well as reflectors, if desired.

Although exemplary embodiments of the invention have been shown and described, many changes, modifications and substitutions may be made by one having ordinary skill in the art without necessarily departing from the spirit and scope of this invention.

We claim:

1. In an illumination system having an illumination source and a hollow light guide adapted for receiving light from the illumination source, the improvement comprising an illumination reflector having a computer-generated reflecting surface, which is designed at least in part by computer-simulated light tracing between the illumination source and the computer-generated reflecting surface, the illumination reflector comprising a non-circular cross-section and being non-elliptical and non-parabolic, and the illumination reflector being adapted for receiving illumination from the illumination source and redirecting a predetermined amount of the illumination to the hollow light guide.

2. The illumination system as recited in claim 1, the illumination source comprising one of a 250 watt bulb and a 400 watt bulb.

3. The illumination system as recited in claim 1, the computer generated reflecting surface increasing a luminous flux of the illumination system.

4. The illumination system as recited in claim 1, the at least one hollow light guide comprising acrylic pipe.

5. The illumination system as recited in claim 1, the illumination reflector comprising aluminum.

6. The illumination system as recited in claim 1, the illumination reflector comprising nickel, and being manufactured by at least one of nickel forming and spinning.

7. The illumination system as recited in claim 1, the computer-generated reflecting surface comprising a curved surface.

8. An illumination system, comprising:
   an illumination source;
   a hallow light guide adapted for receiving light from the illumination source; and
   an illumination reflector having a computer-generated curve the illumination reflector having a non-circular cross-section and being non-elliptical and non-parabolic, the illumination reflector being adapted for receiving illumination from the illumination source and redirecting the illumination to the hollow light guide.

9. The illuminatxon system as recited in claim 8, the hollow light guide comprising a heat-resistant glass.

10. The illumination system as recited in claim 8, the illumination reflector being adapted for redirecting substantially a maximum amount of the illumination to the hollow light guide.

11. The illumination system as recited in claim 8, the hollow light guide comprising a single acrylic pipe.

12. An illumination reflector adapted for use in an illumination system, the illumination system having an illumination source and a hollow light guide adapted for receiving light from the illumination source, the illumination reflector comprising:
   a non-circular cross-section; and
   a computer-generated reflecting surface adapted for maximizing reflections of radiation patterns of the illumination source into the optical component, the computer-generated reflecting surface being non-elliptical and non-parabolic and being based on both measured radiation patterns of the illumination source and computer simulations of different reflecting surfaces for maximizing the reflections of the radiation patterns into the hollow light guide.

13. The illumination reflector as recited in claim 12, further being adapted for receiving illumination from the illumination source and redirecting the illumination to the hollow light guide.

14. The illumination system as recited in claim 12, the computer-generated reflecting surface increasing a luminous flux of the illumination system.

15. The illumination system as recited in claim 12, the illumination source comprising one of a Phillips 250 Watt bulb and a Phillips 400 Watt bulb.

16. An illumination reflector adapted for maximizing reflections from an illumination source onto a hollow light guide, the illumination reflector having a reflecting surface, which comprises a non-circular cross-section and which is non-elliptical and non-parabolic, the illumination reflector being expressible in z and y coordinates, the y-coordinates being measured along an axis that extends perpendicularly to a portion of the computer-generated reflecting surface and through the illumination source, and the z-coordinates expressing radial distances from the y axis, the z and y coordinates of the computer-generated reflecting surface comprising the following specific z and y values, respectively, with a plus or minus twenty percent tolerance for each specific value:

| | |
|---|---|
| −8.390996e−001 | 1.000000e+000 |
| −8.356348e−001 | 1.006527e+000 |
| −8.321400e−001 | 1.013064e+000 |
| −8.286149e−001 | 1.019610e+000 |
| −8.250594e−001 | 1.026166e+000 |
| −8.214731e−001 | 1.032732e+000 |
| −8.190652e−001 | 1.037115e+000 |
| −8.166435e−001 | 1.041503e+000 |
| −8.142079e−001 | 1.045895e+000 |
| −8.117585e−001 | 1.050291e+000 |
| −8.092951e−001 | 1.054693e+000 |
| −8.068178e−001 | 1.059098e+000 |
| −8.043263e−001 | 1.063508e+000 |
| −8.018207e−001 | 1.067923e+000 |
| −7.993009e−001 | 1.072342e+000 |
| −7.967668e−001 | 1.076766e+000 |
| −7.942184e−001 | 1.081195e+000 |
| −7.916556e−001 | 1.085628e+000 |
| −7.890783e−001 | 1.090066e+000 |
| −7.864866e−001 | 1.094509e+000 |
| −7.838802e−001 | 1.098957e+000 |
| −7.812591e−001 | 1.103409e+000 |
| −7.786233e−001 | 1.107866e+000 |
| −7.759727e−001 | 1.112328e+000 |
| −7.733071e−001 | 1.116794e+000 |
| −7.706267e−001 | 1.121265e+000 |
| −7.679313e−001 | 1.125742e+000 |
| −7.652208e−001 | 1.130223e+000 |
| −7.624952e−001 | 1.134709e+000 |
| −7.597544e−001 | 1.139199e+000 |
| −7.569981e−001 | 1.143695e+000 |
| −7.542267e−001 | 1.148196e+000 |
| −7.514398e−001 | 1.152702e+000 |
| −7.486373e−001 | 1.157212e+000 |
| −7.458192e−001 | 1.161728e+000 |
| −7.429856e−001 | 1.166249e+000 |
| −7.401363e−001 | 1.170774e+000 |
| −7.372711e−001 | 1.175305e+000 |
| −7.343900e−001 | 1.179841e+000 |
| −7.314931e−001 | 1.184382e+000 |
| −7.285801e−001 | 1.188928e+000 |
| −7.256508e−001 | 1.193480e+000 |
| −7.227055e−001 | 1.198036e+000 |
| −7.197439e−001 | 1.202598e+000 |
| −7.167659e−001 | 1.207165e+000 |
| −7.137716e−001 | 1.211737e+000 |
| −1.107607e−001 | 1.216314e+000 |
| −7.077332e−001 | 1.220897e+000 |
| −7.046892e−001 | 1.225484e+000 |
| −7.016283e−001 | 1.230077e+000 |

| | |
|---|---|
| −6.985505e−001 | 1.234676e+000 |
| −6.954560e−001 | 1.239280e+000 |
| −6.923444e−001 | 1.243889e+000 |
| −6.892157e−001 | 1.248503e+000 |
| −6.860698e−001 | 1.253123e+000 |
| −6.829068e−001 | 1.257749e+000 |
| −6.797263e−001 | 1.262379e+000 |
| −6.765285e−001 | 1.267016e+000 |
| −6.733131e−001 | 1.271657e+000 |
| −6.700802e−001 | 1.276305e+000 |
| −6.668296e−001 | 1.280957e+000 |
| −6.635612e−001 | 1.285616e+000 |
| −6.602750e−001 | 1.290279e+000 |
| −6.569706e−001 | 1.294949e+000 |
| −6.536483e−001 | 1.299624e+000 |
| −6.503080e−001 | 1.304304e+000 |
| −6.469492e−001 | 1.308990e+000 |
| −6.435723e−001 | 1.313682e+000 |
| −6.401770e−001 | 1.310380e+000 |
| −6.367630e−001 | 1.323083e+000 |
| −6.333305e−001 | 1.327792e+000 |
| −6.298794e−001 | 1.332507e+000 |
| −6.264094e−001 | 1.337227e+000 |
| −6.229205e−001 | 1.341953e+000 |
| −6.194127e−001 | 1.346685e+000 |
| −6.158857e−001 | 1.351423e+000 |
| −6.123395e−001 | 1.356167e+000 |
| −6.087741e−001 | 1.360916e+000 |
| −6.051891e−001 | 1.365671e+000 |
| −6.015848e−001 | 1.370432e+000 |
| −5.979608e−001 | 1.375199e+000 |
| −5.943171e−001 | 1.379972e+000 |
| −5.906538e−001 | 1.384751e+000 |
| −5.869705e−001 | 1.389536e+000 |
| −5.832672e−001 | 1.394327e+000 |
| −5.795437e−001 | 1.399124e+000 |
| −5.758001e−001 | 1.403927e+000 |
| −5.720361e−001 | 1.408736e+000 |
| −5.682516e−001 | 1.413551e+000 |
| −5.644467e−001 | 1.418372e+000 |
| −5.606211e−001 | 1.423199e+000 |
| −5.567746e−001 | 1.428032e+000 |
| −5.529073e−001 | 1.432871e+000 |
| −5.490192e−001 | 1.437717e+000 |
| −5.451097e−001 | 1.442569e+000 |
| −5.411991e−001 | 1.447426e+000 |
| −5.372272e−001 | 1.452290e+000 |
| −5.332538e−001 | 1.457161e+000 |
| −5.292588e−001 | 1.462037e+000 |
| −5.252423e−001 | 1.466920e+000 |
| −5.212038e−001 | 1.471809e+000 |
| −5.171435e−001 | 1.476704e+000 |
| −5.130612e−001 | 1.481605e+000 |
| −5.089566e−001 | 1.486513e+000 |
| −5.048298e−001 | 1.491428e+000 |
| −5.006806e−001 | 1.496348e+000 |
| −4.965090e−001 | 1.501275e+000 |
| −4.923145e−001 | 1.506209e+000 |
| −4.880975e−001 | 1.511148e+000 |
| −4.838575e−001 | 1.516094e+000 |
| −4.795942e−001 | 1.521047e+000 |
| −4.753080e−001 | 1.526006e+000 |
| −4.709986e−001 | 1.530971e+000 |
| −4.666656e−001 | 1.535943e+000 |
| −4.623092e−001 | 1.540922e+000 |
| −4.579290e−001 | 1.545907e+000 |
| −4.535249e−001 | 1.550898e+000 |
| −4.490971e−001 | 1.555896e+000 |
| −4.446452e−001 | 1.560901e+000 |
| −4.401689e−001 | 1.565912e+000 |
| −4.356684e−001 | 1.570930e+000 |
| −4.311435e−001 | 1.575954e+000 |
| −4.265937e−001 | 1.580985e+000 |
| −4.220194e−001 | 1.586023e+000 |
| −4.174202e−001 | 1.591067e+000 |
| −4.127958e−001 | 1.596118e+000 |
| −4.081462e−001 | 1.601176e+000 |
| −4.034315e−001 | 1.606240e+000 |
| −3.987710e−001 | 1.611311e+000 |
| −3.940452e−001 | 1.616389e+000 |

| | |
|---|---|
| −3.892936e−001 | 1.621474e+000 |
| −3.845160e−001 | 1.626565e+000 |
| −3.797123e−001 | 1.631664e+000 |
| −3.748825e−001 | 1.636768e+000 |
| −3.700263e−001 | 1.641880e+000 |
| −3.651434e−001 | 1.646999e+000 |
| −3.602341e−001 | 1.652124e+000 |
| −3.552980e−001 | 1.657256e+000 |
| −3.503346e−001 | 1.662395e+000 |
| −3.453443e−001 | 1.667541e+000 |
| −3.403267e−001 | 1.672694e+000 |
| −3.352816e−001 | 1.677854e+000 |
| −3.302089e−001 | 1.683020e+000 |
| −3.251085e−001 | 1.688194e+000 |
| −3.199801e−001 | 1.693374e+000 |
| −3.148237e−001 | 1.690562e+000 |
| −3.096389e−001 | 1.703756e+000 |
| −3.044257e−001 | 3.708957e+000 |
| −2.991840e−001 | 1.714166e+000 |
| −2.939135e−001 | 1.719381e+000 |
| −2.886139e−001 | 1.724603e+000 |
| −2.832853e−001 | 1.729832e+000 |
| −2.779276e−001 | 1.735068e+000 |
| −2.725404e−001 | 1.740311e+000 |
| −2.671233e−001 | 1.745562e+000 |
| −2.616767e−001 | 1.750819e+000 |
| −2.562001e−001 | 1.756083e+000 |
| −2.506931e−001 | 1.761355e+000 |
| −2.451560e−001 | 1.966633e+000 |
| −2.395884e−001 | 1.771919e+000 |
| −2.339899e−001 | 1.777211e+000 |
| −2.283607e−001 | 1.782511e+000 |
| −2.227005e−001 | 1.787818e+000 |
| −2.190088e−001 | 1.793132e+000 |
| −2.112859e−001 | 1.798453e+000 |
| −2.055313e−001 | 1.903781e+000 |
| −1.997447e−001 | 1.809116e+000 |
| −1.939263e−001 | 1.814459e+000 |
| −1.880757e−001 | 1.819808e+000 |
| −1.821925e−001 | 1.825165e+000 |
| −1.762768e−001 | 1.830529e+000 |
| −1.703284e−001 | 1.835900e+000 |
| −1.643468e−001 | 1.041278e+000 |
| −1.583322e−001 | 1.846663e+000 |
| −1.522843e−001 | 1.852055e+000 |
| −1.462027e−001 | 1.857455e+000 |
| −1.400871e−001 | 1.862862e+000 |
| −1.339377e−001 | 1.868276e+000 |
| −1.277540e−001 | 1.873697e+000 |
| −1.215358e−001 | 1.879125e+000 |
| −1.152831e−001 | 1.884560e+000 |
| −1.08995se−001 | 1.890003e+000 |
| −1.026727e−001 | 1.895453e+000 |
| −9.631479e−002 | 1.900910e+000 |
| −8.992138e−002 | 1.906374e+000 |
| −8.349203e−002 | 1.911845e+000 |
| −7.702696e−002 | 1.917323e+000 |
| −7.052573e−002 | 1.922809e+000 |
| −6.398788e−002 | 1.928302e+000 |
| −5.741365e−002 | 1.933802e+000 |
| −5.080257e−002 | 1.939309e+000 |
| −4.415419e−002 | 1.944823e+000 |
| −3.746874e−002 | 1.950344e+000 |
| −3.074575e−002 | 1.955873e+000 |
| −2.398477e−002 | 1.961408e+000 |
| −1.719601e−002 | 1.966951e+000 |
| −1.034901e−002 | 1.972501e+000 |
| −3.473294e−003 | 1.978058e+000 |
| 3.440909e−003 | 1.983622e+000 |
| 1.039408e−002 | 1.989193e+000 |
| 1.738645e−002 | 1.994771e+000 |
| 2.441853e−002 | 2.000357e+000 |
| 3.149007e−002 | 2.005949e+000 |
| 3.860156e−002 | 2.011549e+000 |
| 4.575350e−002 | 2.017155e+000 |
| 5.294566e−002 | 2.022769e+000 |
| 6.017853e−002 | 2.028390e+000 |
| 6.745263e−002 | 2.034017e+000 |
| 7.476771e−002 | 2.039652e+000 |
| 8.212429e−002 | 2.045293e+000 |

| | | | |
|---|---|---|---|
| 8.952285e−002 | 2.050942e+000 | 5.043260e−001 | 2.332757e+000 |
| 9.696321e−002 | 2.056597e+000 | 5.092384e−001 | 2.335735e+000 |
| 1.044459e−001 | 2.062260e+000 | 5.141654e−001 | 2.338714e+000 |
| 1.119713e−001 | 2.067930e+000 | 5.191070e−001 | 2.341695e+000 |
| 1.195394e−001 | 2.073606e+000 | 5.240627e−001 | 2.344676e+000 |
| 1.271505e−001 | 2.079289e+000 | 5.290332e−001 | 2.347659e+000 |
| 1.348053e−001 | 2.084979e+000 | 5.340185e−001 | 2.350644e+000 |
| 1.425034e−001 | 2.090676e+000 | 5.390180e−001 | 2.353629e+000 |
| 1.502455e−001 | 2.096380e+000 | 5.440325e−001 | 2.356616e+000 |
| 1.580321e−001 | 2.102090e+000 | 5.490618e−001 | 2.359603e+000 |
| 1.658629e−001 | 2.107808e+000 | 5.541056e−001 | 2.362592e+000 |
| 1.737385e−001 | 2.113532e+000 | 5.591645e−001 | 2.365582e+000 |
| 1.816592e−001 | 2.119262e+000 | 5.642384e−001 | 2.368574e+000 |
| 1.896255e−001 | 2.125000e+000 | 5.693269e−001 | 2.371567e+000 |
| 1.976371e−001 | 2.130744e+000 | 5.744308e−001 | 2.374560e+000 |
| 2.056947e−001 | 2.136494e+000 | 5.795496e−001 | 2.377555e+000 |
| 2.137989e−001 | 2.142252e+000 | 5.846831e−001 | 2.380551e+000 |
| 2.219493e−001 | 2.148016e+000 | 5.898322e−001 | 2.383548e+000 |
| 2.260422e−001 | 2.150901e+000 | 5.949962e−001 | 2.386546e+000 |
| 2.301465e−001 | 2.153787e+000 | 6.001757e−001 | 2.389545e+000 |
| 2.342629e−001 | 2.156675e+000 | 6.053705e−001 | 2.392546e+000 |
| 2.383912e−001 | 2.159564e+000 | 6.105803e−001 | 2.395547e+000 |
| 2.425310e−001 | 2.162455e+000 | 6.158059e−001 | 2.398550e+000 |
| 2.466830e−001 | 2.165348e+000 | 6.210469e−001 | 2.401554e+000 |
| 2.508470e−001 | 2.168242e+000 | 6.263031e−001 | 2.404558e+000 |
| 2.550226e−001 | 2.171138e+000 | 6.315751e−001 | 2.407564e+000 |
| 2.592105e−001 | 2.174036e+000 | 6.369628e−001 | 2.410571e+000 |
| 2.634105e−001 | 2.176935e+000 | 6.421657e−001 | 2.413579e+000 |
| 2.676223e−001 | 2.179835e+000 | 6.474848e−001 | 2.416588e+000 |
| 2.718465e−001 | 2.182738e+000 | 6.528195e−001 | 2.419598e+000 |
| 2.760829e−001 | 2.185642e+000 | 6.581699e−001 | 2.422609e+000 |
| 2.803312e−001 | 2.188547e+000 | 6.635363e−001 | 2.425621e+000 |
| 2.845920e−001 | 2.191454e+000 | 6.689187e−001 | 2.428634e+000 |
| 2.888652e−001 | 2.194363e+000 | 6.743166e−001 | 2.431647e+000 |
| 2.931504e−001 | 2.197273e+000 | 6.797310e−001 | 2.434662e+000 |
| 2.974482e−001 | 2.200185e+000 | 6.851614e−001 | 2.437678e+000 |
| 3.017585e−001 | 2.203099e+000 | 6.906076e−001 | 2.440695e+000 |
| 3.060809e−001 | 2.206013e+000 | 6.960704e−001 | 2.443712e+000 |
| 3.104161e−001 | 2.208930e+000 | 7.015494e−001 | 2.446731e+000 |
| 3.147638e−001 | 2.211848e+000 | 7.070442e−001 | 2.449750e+000 |
| 3.191238e−001 | 2.214768e+000 | 7.125558e−001 | 2.452770e+000 |
| 3.234967e−001 | 2.217689e+000 | 7.180838e−001 | 2.455791e+000 |
| 3.278823e−001 | 2.220612e+000 | 7.236279e−001 | 2.458813e+000 |
| 3.322802e−001 | 2.223536e+000 | 7.291889e−001 | 2.461836e+000 |
| 3.366912e−001 | 2.226462e+000 | 7.349663e−001 | 2.464860e+000 |
| 3.411150e−001 | 2.229389e+000 | 7.403600e−001 | 2.467884e+000 |
| 3.455513e−001 | 2.232318e+000 | 7.459708e−001 | 2.470910e+000 |
| 3.500007e−001 | 2.235248e+000 | 7.515983e−001 | 2.473936e+000 |
| 3.544631e−001 | 2.238180e+000 | 7.572422e−001 | 2.476963e+000 |
| 3.589380e−001 | 2.241113e+000 | 7.629033e−001 | 2.479990e+000 |
| 3.634263e−001 | 2.244048e+000 | 7.685812e−001 | 2.483018e+000 |
| 3.679273e−001 | 2.246984e+000 | 7.742757e−001 | 2.486047e+000 |
| 3.724417e−001 | 2.249922e+000 | 7.799876e−001 | 2.489077e+000 |
| 3.769692e−001 | 2.252861e+000 | 7.857166e−001 | 2.492107e+000 |
| 3.815096e−001 | 2.255802e+000 | 7.914622e−001 | 2.495138e+000 |
| 3.860634e−001 | 2.258744e+000 | 7.972255e−001 | 2.498170e+000 |
| 3.906305e−001 | 2.261688e+000 | 8.030060e−001 | 2.501203e+000 |
| 3.952106e−001 | 2.264633e+000 | 8.088034e−001 | 2.504236e+000 |
| 3.998043e−001 | 2.267580e+000 | 8.146185e−001 | 2.507270e+000 |
| 4.044114e−001 | 2.270528e+000 | 8.204510e−001 | 2.510304e+000 |
| 4.090316e−001 | 2.273477e+000 | 8.263004e−001 | 2.513339e+000 |
| 4.136655e−001 | 2.276428e+000 | 8.321680e−001 | 2.516375e+000 |
| 4.183130e−001 | 2.279380e+000 | 8.380530e−001 | 2.519411e+000 |
| 4.229737e−001 | 2.282334e+000 | 8.439552e−001 | 2.522447e+000 |
| 4.276484e−001 | 2.285289e+000 | 8.498755e−001 | 2.525484e+000 |
| 4.323366e−001 | 2.288246e+000 | 8.558131e−001 | 2.528522e+000 |
| 4.370382e−001 | 2.291204e+000 | 8.617690e−001 | 2.531560e+000 |
| 4.417539e−001 | 2.294163e+000 | 8.677427e−001 | 2.534599e+000 |
| 4.464833e−001 | 2.297124e+000 | 8.737339e−001 | 2.537637e+000 |
| 4.512262e−001 | 2.300086e+000 | 8.797435e−001 | 2.540677e+000 |
| 4.559834e−001 | 2.303049e+000 | 8.857711e−001 | 2.543717e+000 |
| 4.607544e−001 | 2.306014e+000 | 8.918164e−001 | 2.546757e+000 |
| 4.655391e−001 | 2.308980e+000 | 8.978803e−001 | 2.549798e+000 |
| 4.703381e−001 | 2.311948e+000 | 9.039624e−001 | 2.552840e+000 |
| 4.751511e−001 | 2.314917e+000 | 9.100624e−001 | 2.555881e+000 |
| 4.799778e−001 | 2.317887e+000 | 9.161811e−001 | 2.558923e+000 |
| 4.848191e−001 | 2.320858e+000 | 9.223182e−001 | 2.561965e+000 |
| 4.896745e−001 | 2.323831e+000 | 9.284734e−001 | 2.565008e+000 |
| 4.945438e−001 | 2.326805e+000 | 9.346475e−001 | 2.568051e+000 |
| 4.994278e−001 | 2.329780e+000 | 9.408402e−001 | 2.571094e+000 |

-continued

| | |
|---|---|
| 9.470512e−001 | 2.574138e+000 |
| 9.532812e−001 | 2.577181e+000 |
| 9.595300e−001 | 2.580225e+000 |
| 9.657971e−001 | 2.583269e+000 |
| 9.720836e−001 | 2.586313e+000 |
| 9.783891e−001 | 2.589358e+000 |
| 9.847132e−001 | 2.592403e+000 |
| 9.910567e−001 | 2.595447e+000 |
| 9.974194e−001 | 2.598492e+000 |
| 1.003801e+000 | 2.601537e+000 |
| 1.010202e+000 | 2.604582e+000 |
| 1.016622e+000 | 2.607627e+000 |
| 1.023062e+000 | 2.610672e+000 |
| 1.029521e+000 | 2.613717e+000 |
| 1.036000e+000 | 2.616762e+000 |
| 1.042498e+000 | 2.619807e+000 |
| 1.049016e+000 | 2.622851e+000 |
| 1.055553e+000 | 2.625896e+000 |
| 1.062110e+000 | 2.628941e+000 |
| 1.068688e+000 | 2.631985e+000 |
| 1.075285e+000 | 2.635030e+000 |
| 1.081902e+000 | 2.638074e+000 |
| 1.088539e+000 | 2.641118e+000 |
| 1.095196e+000 | 2.644162e+000 |
| 1.101873e+000 | 2.647205e+000 |
| 1.108571e+000 | 2.650249e+000 |
| 1.115289e+000 | 2.653292e+000 |
| 1.122027e+000 | 2.656334e+000 |
| 1.128786e+000 | 2.659377e+000 |
| 1.135565e+000 | 2.662419e+000 |
| 1.142365e+000 | 2.665461e+000 |
| 1.149185e+000 | 2.668502e+000 |
| 1.156026e+000 | 2.671543e+000 |
| 1.162888e+000 | 2.674583e+000 |
| 1.169971e+000 | 2.677623e+000 |
| 1.176674e+000 | 2.680662e+000 |
| 1.183599e+000 | 2.683701e+000 |
| 1.190544e+000 | 2.686739e+000 |
| 1.197511e+000 | 2.689777e+000 |
| 1.204499e+000 | 2.692814e+000 |
| 1.211508e+000 | 2.695851e+000 |
| 1.217538e+000 | 2.698886e+000 |
| 1.225590e+000 | 2.701921e+000 |
| 1.232663e−000 | 2.704956e+000 |
| 1.239758e+000 | 2.707990e+000 |
| 1.246874e+000 | 2.711023e+000 |
| 1.254012e+000 | 2.714055e+000 |
| 1.261173e+000 | 2.717086e+000 |
| 1.268354e+000 | 2.720117e+000 |
| 1.275557e+000 | 2.723146e+000 |
| 1.282783e+000 | 2.726175e+000 |
| 1.290030e+000 | 2.729203e+000 |
| 1.297299e+000 | 2.732229e+000 |
| 1.304591e+000 | 2.735255e+000 |
| 1.311905e+000 | 2.738279e+000 |
| 1.319241e+000 | 2.741303e+000 |
| 1.326600e+000 | 2.744325e+000 |
| 1.333980e+000 | 2.747347e+000 |
| 1.341384e+000 | 2.750367e+000 |
| 1.348810e+000 | 2.753386e+000 |
| 1.356259e+000 | 2.756404e+000 |
| 1.363730e+000 | 2.759421e+000 |
| 1.371225e+000 | 2.762436e+000 |
| 1.378741e+000 | 2.765450e+000 |
| 1.386281e+000 | 2.768463e+000 |
| 1.393845e+000 | 2.771474e+000 |
| 1.401431e+000 | 2.774484e+000 |
| 1.409040e+000 | 2.777492e+000 |
| 1.416673e+000 | 2.780500e+000 |
| 1.424329e+000 | 2.783505e+000 |
| 1.432008e+000 | 2.786509e+000 |
| 1.439711e+000 | 2.789511e+000 |
| 1.447437e+000 | 2.792512e+000 |
| 1.455187e+000 | 2.795511e+000 |
| 1.462961e+000 | 2.798509e+000 |
| 1.470758e+000 | 2.801504e+000 |
| 1.478579e+000 | 2.804498e+000 |
| 1.486425e+000 | 2.807491e+000 |
| 1.494294e+000 | 2.810481e+000 |
| 1.502187e+000 | 2.813469e+000 |

-continued

| | |
|---|---|
| 1.510105e+000 | 2.816456e+000 |
| 1.518046e+000 | 2.819441e+000 |
| 1.526012e+000 | 2.822423e+000 |
| 1.534003e+000 | 2.825405e+000 |
| 1.542018e+000 | 2.828383e+000 |
| 1.550057e+000 | 2.831360e+000 |
| 1.558121e+000 | 2.834335e+000 |
| 1.566210e+000 | 2.837307e+000 |
| 1.574323e+000 | 2.840277e+000 |
| 1.582462e+000 | 2.843245e+000 |
| 1.590624e+000 | 2.846210e+000 |
| 1.598812e+000 | 2.849173e+000 |
| 1.607026e+000 | 2.852134e+000 |
| 1.615264e+000 | 2.855093e+000 |
| 1.623527e+000 | 2.858048e+000 |
| 1.631817e+000 | 2.861002e+000 |
| 1.640131e+000 | 2.863953e+000 |
| 1.648470e+000 | 2.866901e+000 |
| 1.656835e+000 | 2.869847e+000 |
| 1.665227e+000 | 2.872790e+000 |
| 1.673643e+000 | 2.875730e+000 |
| 1.682085e+000 | 2.878668e+000 |
| 1.690554e+000 | 2.881603e+000 |
| 1.699048e+000 | 2.884535e+000 |
| 1.707568e+000 | 2.887464e+000 |
| 1.716115e+000 | 2.890391e+000 |
| 1.724687e+000 | 2.893314e+000 |
| 1.733286e+000 | 2.896234e+000 |
| 1.741912e+000 | 2.899152e+000 |
| 1.750563e+000 | 2.902066e+000 |
| 1.759240e+000 | 2.904976e+000 |
| 1.767946e+000 | 2.907884e+000 |
| 1.776677e+000 | 2.910789e+000 |
| 1.785435e+000 | 2.913690e+000 |
| 1.794220e+000 | 2.916588e+000 |
| 1.803032e+000 | 2.919482e+000 |
| 1.811870e+000 | 2.922373e+000 |
| 1.820737e+000 | 2.925260e+000 |
| 1.829629e+000 | 2.928144e+000 |
| 1.838549e+000 | 2.931024e+000 |
| 1.847498e+000 | 2.933901e+000 |
| 1.856472e+000 | 2.936774e+000 |
| 1.865474e+000 | 2.939643e+000 |
| 1.874505e+000 | 2.942509e+000 |
| 1.883562e+000 | 2.945370e+000 |
| 1.892648e+000 | 2.948228e+000 |
| 1.901761e+000 | 2.951081e+000 |
| 1.910902e+000 | 2.953931e+000 |
| 1.920071e+000 | 2.956776e+000 |
| 1.929269e+000 | 2.959618e+000 |

17. An illumination system comprising an illumination source and a hollow light guide adapted for receiving light from the illumination source, the improvement comprising an illumination reflector having a reflecting surface, the reflecting surface comprising a non-circular cross-section and being non-elliptical and non-parabolic, and the reflecting surface being adapted for receiving illumination from the illumination source and redirecting substantially a maximum amount of the illumination to the hollow light guide.

18. The illumination system as recited in claim 17, the reflecting surface being computer generated.

19. An illumination system, comprising
an illumination source having a characteristic radiation pattern;
a hollow light guide adapted for receiving light from the illumination source; and
an illumination reflector having a reflecting surface that is customized for generating a predetermined radiation product upon receipt of the characteristic radiation pattern, the illumination reflector comprising a non-circular cross-section and being non-elliptical and non-parabolic, and the illumination reflector being adapted for directing at least a portion of the predetermined radiation product to the hollow light guide.

20. The illumination system as recited in claim 19, the reflecting surface being computer generated.

21. The illumination system as recited in claim 19, the illumination reflector being adapted for redirecting substantially a maximum amount of the characteristic radiation pattern to the hollow light guide.

22. An illumination system, comprising:

an illumination source;

an optical heat-resistant glass adapted for receiving light from the illumination source; and an illumination reflector having a computer-generated curve, the illumination reflector having a non-circular cross-section and being non-elliptical and non-parabolic, the illumination reflector being adapted for receiving illumination from the illumination source and redirecting the illumination to the optical heat-resistant glass.

* * * * *